INVENTORS
Wilhelm Grimm
Fritz Rudolf Güntsch
Günther Luther &
Werner Strauss

United States Patent Office 3,426,179
Patented Feb. 4, 1969

3,426,179
DOCUMENT PROCESSING ARRANGEMENT
Wilhelm Grimm, Fritz Rudolf Guntsch, and Werner Strauss, Constance, Germany, and Gunther Luther, Marly-le-Roi, Yvelines, France, assignors to Telefunken Patentverwertungsgesellschaft m.b.H.
Filed Dec. 15, 1965, Ser. No. 514,060
Claims priority, application Germany, Dec. 28, 1964, T 27,715
U.S. Cl. 235—61.11      3 Claims
Int. Cl. G06k 7/00; B07c 5/00

ABSTRACT OF THE DISCLOSURE

In a document processing installation including a reading device through which a succession of documents pass, a data processing computer for reading the information contained on the documents in order to determine the further processing to which each document is to be subjected, and a document handling device for further processing the documents in accordance with the data supplied by the computer, two successive waiting stations disposed in line between the reading device and the document handling device and electrically connected to the computer and handling device for causing each document in succession to be released from the downstream waiting station only when the document handling device has received the document processing information relating to that document and for holding a succeeding document in the upstream waiting station, and preventing the reading of any subsequent documents, until the document then in the downstream waiting station is released to the document handling device.

---

The present invention relates to document processing and particularly to an arrangement for rapidly processing a succession of individual documents.

The present invention is concerned with a document processing installation of the type including a reading device through which a succession of documents are caused to pass individually, a data processing installation, such as a computer, which, on the basis of the information read from the document and supplied to the computer, determines, among other things, the additional data required for the further processing of the document, and a document processing device in which the documents coming from the reading device are further processed in accordance with the additional data supplied by the computer. It should be understood that the term "further processing" is here intended to mean not only the subsequent sorting of the documents, for example according to their nature, but also the conveyance of specific documents to another part of the installation in which they are added to previously conveyed documents and are packaged together therewith.

In a typical installation of this type the computer prepares financial account extracts from the information contained on the documents and commands the processing device to pass each document on to an appropriate packaging station at which they are packaged with the extract with which they belong.

In order to set forth more clearly the problem with which the present invention is concerned, reference will here be made to the arrangement of FIGURE 1 which schematically shows a document processing installation. This installation includes a separator 2 containing a stack of documents to be processed. Each time a withdrawal instruction is sent over the line 1' from the data processing installation 1 to the separator 2, a document is withdrawn from the supply stack and is passed along a conveyor path, which is indicated by double lines, to a reading device 3. For the sake of simplicity, the data processing installation 1 of FIGURE 1 and of the other figures described herein will be referred to as a computer. While the document is in the reading device 3, the information which it contains is read and is conducted in a suitable form over a line 3' to the computer 1. Based on the information conveyed to the computer 1, the latter executes the appropriate operations and also determines the additional data which must be supplied for the further processing of the document in the document processing device 4. This additional information will be referred to hereafter as "processing information." The document is then conveyed to the processing device 4 and the processing information is supplied to the device 4 via the line 1". After this processing information has been delivered to the device 4, the computer gives another withdrawal instruction to the separator 2 in order to cause the next document to be conveyed to the reading device 3.

In order that a processing installation of the above-described type may function satisfactorily, the processing information must be delivered to the document processing device 4 before the corresponding document has arrived at that device. In other words, the maximum time necessary for the data processing must be less than the travel time of the document from the reading device 3 to the document processing device 4.

It may be appreciated that the computer 1 could be a data processing installation having a large external memory. In such a case, the required computing time is sufficiently short to eliminate the need for a special arrangement for controlling the conveyance of a document from the reading device 3 to the processing device 4. In many cases, however, the computing time is not sufficiently short to carry out a complete computing operation in the time normally required for conveying the document from the reading device to the processing device. Often the time necessary for the computing operation associated with each document might vary from document to document between a few milliseconds and a few seconds.

It is therefore desirable to ensure, by appropriate selection of the speed with which the document is conveyed from the reading device 3 to the document processing device 4, that the corresponding travel time of the documents is not shorter than the longest possible computing time. This would mean a waste of time, however, in all cases where a shorter calculating time is sufficient and would lead to a considerable reduction in the working speed of the machine. Alternatively, the storage unit associated with the computer may be suitably constructed to permit a sufficiently short access time in all cases. However, this solution will generally involve a considerable increase in cost of the overall installation.

Another procedure which has been tried in practice consists in that, during a first run-through of the documents, those documents which require further processing are directed into a separate compartment and the processing information to be allocated to them is stored in corresponding sequence in an inermediate store. These documents are then read again in a further run-through and are supplied to the processing device together with the processing instructions which are then rapidly available. It may be appreciated that this procedure involves a relatively long processing time.

It is a primary object of the present invention to overcome the above-noted drawbacks.

It is a more specific object of the present invention to permit a succession of documents to be processed in a minimum amount of time.

It is another specific object of the present invention to cause the rate of conveyance of each document of a series to be determined by the computing time required for that document.

The invention involves a document processing installation, which, despite using a computer having a relatively long memory access time, permits a complete document processing of the type described earlier in this specification, in a single run-through without being subjected to the above-mentioned disadvantages. This is achieved by the provision of a first document delay device or waiting station, inserted between the reading device and the document processing device and is constructed in such a manner that it permits a rapid subsequent conveyance of the document which has entered it only after the arrival of a release signal which is supplied thereto from the computer as soon as the processing information for the particular document has been derived and has been conducted to the document processing device.

The invention further includes a second waiting station inserted between the first waiting station and the reading device for temporarily halting a document received from the reading device and for passing the document onto the first waiting station upon receipt of a control signal, a first control device inserted between the first and second waiting stations for delivering a control signal to the second waiting station when the document then contained in the first waiting station is conveyed to the processing device, and an input store connected between the reading device and the computer and including two store portions each of which temporarily stores the information read from a respective one of the documents then contained in the second and first waiting stations.

Additional objects and advantages of the present invention will become apparent upon consideration of the following description when taken in conjunction with the accompanying drawings in which.

Figure 1:
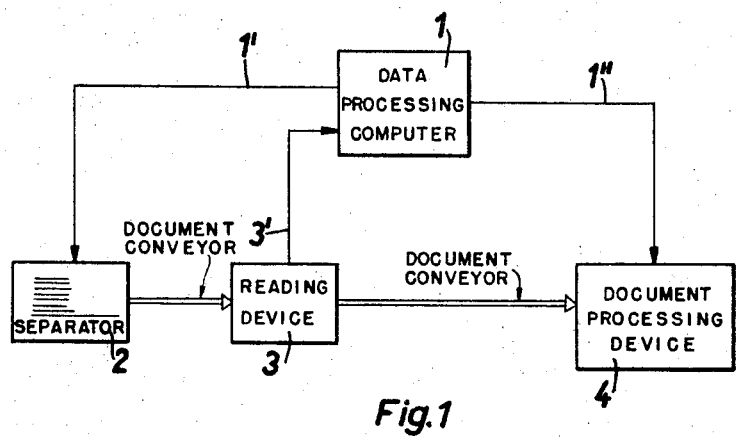
FIGURE 1 is a block diagram of a document processing installation.

FIGURE 1 has already been described in detail above.

Figure 2:
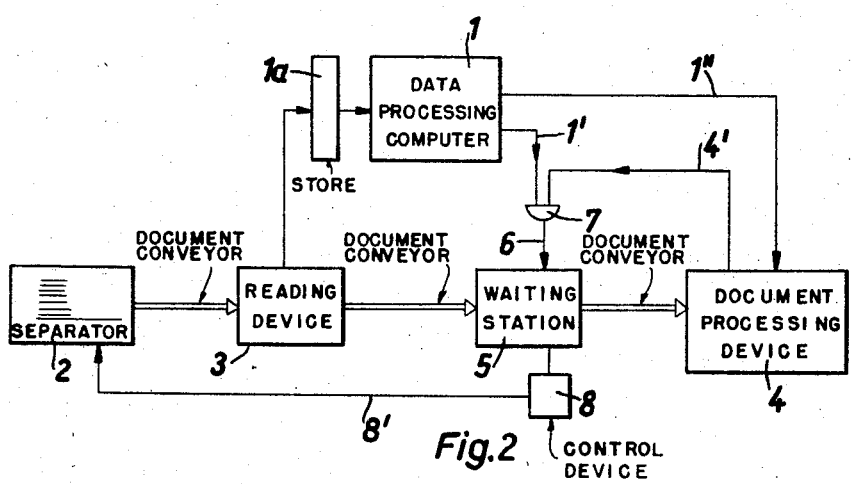
FIGURE 2 is a block diagram of a document processing installation according to a first embodiment of the present invention.

Referring now to FIGURE 2, there is shown a document processing installation which differs from that illustrated in FIGURE 1 in that a document delay device 5, which will be referred to hereinafter as a waiting station, is inserted between the reading device 3 and the document processing device 4. This waiting station 5 is designed in such a manner that it permits a rapid subsequent conveyance of the document entering it, or which has entered it, only after the arrival of a release signal via a control line 6. The release signal is given from the computer 1 via the line 1' and an AND-gate 7. Also supplied to this AND-gate through a line 4' is a gating signal which generally indicates that the document processing device 4 is ready to receive the document presently being held in waiting station 5. An input store 1a, which is provided ahead of the computer 1, receives the read document information directly. In addition, a control device 8 has an input connected to the waiting station 5 and delivers, through a control line 8', an instruction to the separator 2, to withdraw a succeeding document when the subsequent conveyance of the document then in waiting station 5 has commenced.

In the operation of the installation shown in FIGURE 2, after a document withdrawn from the separator 2 has run through the reading station 3 and the document information has been supplied to the computer 1 through the connection 3' and the store 1a the document enters the waiting station 5 and is there delayed, or held back, until the release signal arrives. This signal is produced by the computer 1 as soon as the processing instruction for this document has been determined therein and has been conducted to the document processing device 4 through the line 1".

The release signal is delivered over line 1' to one input of AND-gate 7. When the document processing device 4 has suitably responded to the processing information delivered via line 1" and is in a condition to receive the document presently being held in waiting station 5, the device 4 delivers a gating signal over the line 4' to a gating input of AND-gate 7. This gating signal permits the AND-gate to pass the release signal via line 6 to the waiting station.

When the release signal is delivered over line 6, the document is rapidly conveyed out of the waiting station 5 and into the document processing device 4. Simultaneously, the control device 8 responds to a signal from station 5 and sends the separator 2 via line 8' the instruction for the withdrawal of the next document, after which the above-described sequence of operations is repeated.

It should be noted that if the calculating time in an individual case is so short that the release signal from the computer 1 has already reached the waiting station 5 before the associated document has arrived there, the document is not delayed in the waiting station but runs through it with unreduced speed.

Figure 3:
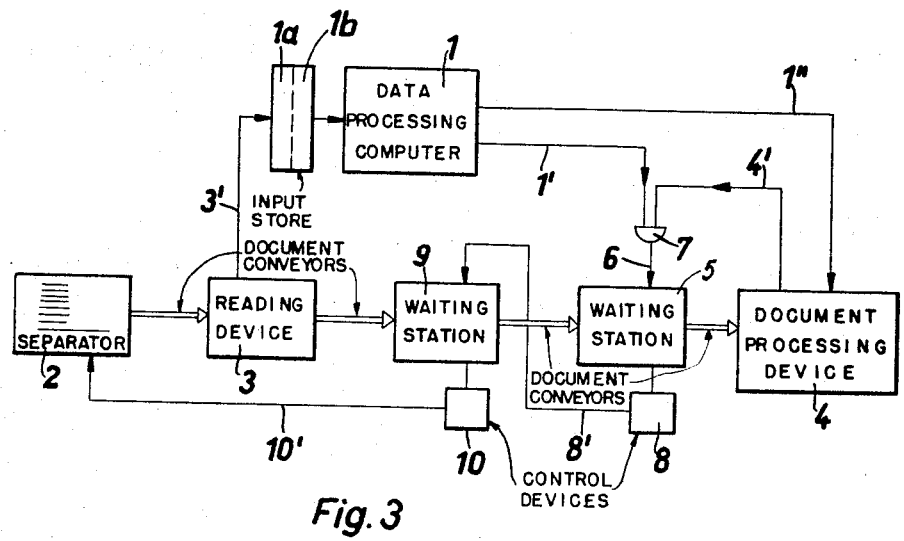
FIGURE 3 is a block diagram of a document processing installation according to another embodiment of the present invention.

A further particularly advantageous arrangement of a document processing installation according to the present invention is shown in FIGURE 3. Here is a second waiting station 9, of similar construction to station 5, is inserted between the reading device 3 and the waiting station 5 previously described. The control device 8 associated with the first waiting station 5 does not give the withdrawal instruction for the separator 2, as a result of the release of the document which has entered it, but produces a release signal for the second waiting station 9 through the control line 8'. A further control device 10 is provided and it is this device which gives the instruction, via a control line 10', for the withdrawal of the next document to the separator 2 as a result of the release of the document present in the second reading station 9. There is, however, the possibility, within the scope of the invention, of dispensing with the control device 10, for example, and of delivering both the withdrawal instruction for the separator 2 and the release signal for the waiting station 9 from the control device 8. Furthermore, the input store ahead of the computer 1 has two serially connected storage portions 1a and 1b at its disposal, corresponding respectively to the waiting stations 9 and 5.

In the document processing installation shown in FIGURE 3, two documents are first withdrawn in sequence from the separator 2. After the first document has been read, its information, which has been passed on to the store portion 1b, is passed into, and processed by, the computer 1. The document then runs through the waiting station 9 into the waiting station 5 where it is held. The following document is then read and its information is first retained in the store 1a of the computer. The document itself enters the waiting station 9 and is stopped there. When the computer has finished processing the information for the first document, it sends an information signal over line 1" to device 4 and a release signal for this document over line 1' to gate 7. Then, upon the appearance of a gating signal from the document processing device 4 on the line 4', the document is conveyed from station 5 to device 4. As a result of the conveyance of the document out of station 5, a release signal for the waiting station 9 is sent from the control device 8 via the control line 8', causing the document present in the waiting station 9 to be transferred to the waiting station 5, and causing the information read therefrom to be shifted into the store portion 1b. At the same time, the instruction for the withdrawal of the next document is sent to the separator 2 from the control device 10 via control line 10'.

While the processing of the information of the document then in station 5 is taking place in the computer, a further document is conveyed to the waiting station 9 through the reading device 3 and its information is retained in the store 1a. Thus, immediately after the complete processing of the information of one document, the information of the next document is available to the computer 1. As a result, the inevitable travel time for the documents between the separator 2 and the reading device 3 no longer causes a period of inactivity for the computer 1.

However, the computer 1 may still experience a waiting period between the end of the information processing of the $(n)$th document and the beginning of the information processing of the $(n+1)$th document, if the information processing time in the computer for the $(n)$th document was so short that the $(n+1)$th document could be completely read before the end of this processing time. Should it be desired to avoid this relatively short waiting time, which will probably only occur occasionally this can be achieved by the provision of yet another, or a plurality of, further awaiting stations inserted between the reading device 3, and the document processing device 4 and by the provision of corresponding further storage portions in the input store of the computer 1 arranged as described above.

Instead of the store regions 1a and 1b illustrated in the form of storage shift registers, store portions which are accessible independently of one another could be provided in which read-in is effected from the reading device sequentially and which are interrogated in substantially the same manner by the computer.

The document delay devices or waiting stations used for the realization of the invention may be constructed in any desired manner provided they render it possible to delay or stop a document which has entered them and to convey it further rapidly only after receiving release signal. Such devices are known as such in the conveying art, and are described for instance in the French Patent No. 1,222,497.

The remaining components of the installations of FIGURES 2 and 3 may all be constituted by known devices. For example, the separator 2 may be constituted by the device shown and described in detail in U.S. application Ser. No. 417,898 filed by Karl Rehm on Dec. 14, 1964, now Patent No. 3,312,464, and assigned to the same assignee as in the present case.

In addition the control devices 8 and 10 may be constituted by any suitable, well-known signal transducers capable of producing a suitable signal in response to the passage of an object, and the input store and computer 1 may be constituted by any well-known, suitably programmed device capable of carrying out the particular operation required.

It will be understood that the above description of the present invention is susceptible to various modifications, changes, and adaptations, and the same are intended to be comprehended within the meaning and range of equivalents of the appended claims.

What is claimed is:

1. In a document processing installation for individually processing a succession of documents in accordance with the information contained thereon, which installation includes a separator having a controlled input for delivering a succeeding document from a stack each time a control signal is applied to its control input, and a reading device connected to receive a succession of individual documents delivered by the separator and to read the information contained on each of the documents as it passes through the reading device, the combination comprising:

(a) a data processing computer connected to receive the information read from each succeeding document by the reading device for producing, based on the information supplied from the reading device for each document, a processing information signal which determines the further processing to which the associated document will be subjected and a release signal each time a complete processing information signal is produced for each document;

(b) a document processing device connected to receive each document in turn and to receive each processing information signal from said computer for processing each document received in accordance with the processing information signal produced by said computer for that document;

(c) a first waiting station inserted between the reading device and said document processing device and having a controlled input connected to receive the release signal produced by said computer for permitting each document to pass to said document processing device only after the processing information signal associated with that document has been conducted from said computer to said document processing device; and (d) a second waiting station inserted between said first waiting station and the reading device for temporarily halting a document received from the reading device and for passing the document onto said first waiting station only upon receipt of a control signal;

(e) a first control device inserted between said first waiting station and said second waiting station for delivering a control signal to said second waiting station when the document then contained in said first waiting station is conveyed to said processing device; and (f) an input store connected between the reading device and said computer and including two store portions each of which stores the information read from a respective one of the documents contained in said first and second waiting stations.

2. An arrangement as defined in claim 1 wherein said document processing device has an output for presenting a gating signal each time said processing device has been placed in condition for operating on the document then contained in said first waiting station in accordance with the processing information signal received by said processing device for that document, said arrangement further comprising a gate circuit connected between said computer and said first waiting station and having a gating terminal connected to said output of said processing device for permitting the release signal from said computer to be applied to the control input of said first waiting station only when a gating signal appears on said output of said document processing device.

3. An arrangement as defined in claim 1, further comprising a second control device inserted between said second waiting station and the separator for commanding the separator to deliver another document to the reading device when the document then contained in said second waiting station is conveyed to said first waiting station.

References Cited

UNITED STATES PATENTS

| 2,731,199 | 1/1956 | Gherthan et al. | 235—61.71 |
| 2,965,291 | 12/1960 | Hayes et al. | 235—61.114 XR |
| 3,083,012 | 3/1963 | Poland | 271—64 |

MAYNARD R. WILBUR, *Primary Examiner.*

SOL SHEINBEIN, *Assistant Examiner.*

U.S. Cl. X.R.

209—110; 235—61.7